(12) United States Patent
Corwin (10) Patent No.: US 7,372,868 B2
(45) Date of Patent: May 13, 2008

(54) MOBILE AGENT CONNECTIVITY

(75) Inventor: Susan Julia Corwin, Rhododendron, OR (US)

(73) Assignee: Intel Corporation, Santa Clara, CA (US)

( * ) Notice: Subject to any disclaimer, the term of this patent is extended or adjusted under 35 U.S.C. 154(b) by 606 days.

(21) Appl. No.: 09/739,537

(22) Filed: Dec. 14, 2000

(65) Prior Publication Data

US 2002/0075812 A1  Jun. 20, 2002

(51) Int. Cl.
*H04L 12/66* (2006.01)
(52) U.S. Cl. .................. 370/463; 370/465; 370/331; 455/436
(58) Field of Classification Search .............. 370/313, 370/401, 405, 410, 463; 709/219, 228, 230, 709/245, 225; 455/433, 435.1
See application file for complete search history.

(56) References Cited

U.S. PATENT DOCUMENTS

| | | | |
|---|---|---|---|
| 5,159,592 A | 10/1992 | Perkins | |
| 5,410,543 A | 4/1995 | Seitz et al. | |
| 5,442,633 A | 8/1995 | Perkins et al. | |
| 5,708,655 A * | 1/1998 | Toth et al. | 370/313 |
| 6,130,892 A * | 10/2000 | Short et al. | 370/401 |
| 6,134,230 A * | 10/2000 | Olofsson et al. | 370/337 |
| 6,137,791 A * | 10/2000 | Frid et al. | 370/352 |
| 6,137,802 A * | 10/2000 | Jones et al. | 370/401 |
| 6,144,671 A * | 11/2000 | Perinpanathan et al. | 370/409 |
| 6,496,505 B2 * | 12/2002 | La Porta et al. | 370/392 |
| 6,522,880 B1 * | 2/2003 | Verma et al. | 455/436 |
| 6,535,493 B1 * | 3/2003 | Lee et al. | 370/329 |
| 6,546,425 B1 * | 4/2003 | Hanson et al. | 709/227 |
| 6,553,015 B1 * | 4/2003 | Sato | 370/331 |
| 6,571,289 B1 * | 5/2003 | Montenegro | 709/227 |
| 6,578,085 B1 * | 6/2003 | Khalil et al. | 709/241 |
| 6,591,306 B1 * | 7/2003 | Redlich | 709/245 |
| 6,621,810 B1 * | 9/2003 | Leung | 370/338 |
| 6,684,256 B1 * | 1/2004 | Warrier et al. | 709/238 |
| 6,697,354 B1 * | 2/2004 | Borella et al. | 370/352 |
| 6,701,361 B1 * | 3/2004 | Meier | 709/224 |
| 6,738,362 B1 * | 5/2004 | Xu et al. | 370/329 |
| 6,757,273 B1 * | 6/2004 | Hsu et al. | 370/349 |
| 6,856,624 B2 * | 2/2005 | Magret | 370/392 |
| 6,915,325 B1 * | 7/2005 | Lee et al. | 709/202 |

OTHER PUBLICATIONS

Perkins et al., "Route Optimization in Mobile IP", Feb. 15, 2000, www.search.ietf.org/internet-drafts/draft-ietf-mobileip-optim-09. txt.
David B. Johnson et al., "Mobility Support in IPv6", Apr. 27, 2000, IETF Mobile IP Working Group Internet-Draft.
C. Perkins et al., IP Mobility Support, Oct. 1996, rfc2002—Network Working Group.
Mobile IP will fuel mobile computing broom, p. 41-45, Info World (22,9) Feb. 28, 2000.

(Continued)

*Primary Examiner*—Wing Chan
*Assistant Examiner*—Robert C Scheibel
(74) *Attorney, Agent, or Firm*—Fish & Richardson P.C.

(57) ABSTRACT

Mobile agent connectivity includes dynamically determining addressing information for a mobile device at a mechanism configured to provide the mobile device with access to a network.

23 Claims, 5 Drawing Sheets

OTHER PUBLICATIONS

Mobility Support in IPv6, IETF Mobile IP Working Group, draft 10, Feb. 10, 2000.
IP encapsulation within IP. RFC 2003, Charles Perkins. Oct. 1996.
IP mobility support. RFC 2002, Charles Perkins, editor. Oct. 1996.
Minimal encapsulation within IP. RFC 2004, Charles Perkins, Oct. 1996.
Route optimization in Mobile IP, Charles Perkins and David B. Johnson. Feb. 1999. (in progress).

* cited by examiner

MOBILE AGENT CONNECTIVITY

BACKGROUND

This invention relates to mobile agent connectivity.

Mobile agents are devices including laptop and portable computers, personal digital assistants, telephones, and other wireless or personal devices capable of connecting to a network from varied locations. To connect to an Internet Protocol (IP) based network, a mobile agent needs to establish an IP address presence that allows packets to be sent to the mobile agent from arbitrary points in the IP network. However, a purpose of IP addressing is to route packets to a fixed location, and making the destination mobile is at odds with this purpose.

Typically, to establish an IP presence, a mobile agent is in a static subnet that broadcasts, routes, or switches packets to a medium configured to communicate with the mobile agent. The mobile agent may establish an IP presence in a number of ways. The agent may have a statically assigned IP address that an upstream host, e.g., the medium, can directly deliver packets to. If the agent maintains such a static IP address, only subnets recognizing the static IP address may safely be the last step in a communication to the agent.

In another approach, the agent may have a dynamically assigned IP address allowing routing to the appropriate delivery medium that was assigned using a protocol such as dynamic host configuration protocol (DHCP). In this case, a foreign agent that assigned the address is the last step in routing data to the agent.

In a third approach, the agent may be located in a non-IP network, such as telephone company networks, where an IP packet enters the non-IP network through a specific portal and is routed to the mobile agent based upon a global map.

Figure 1:
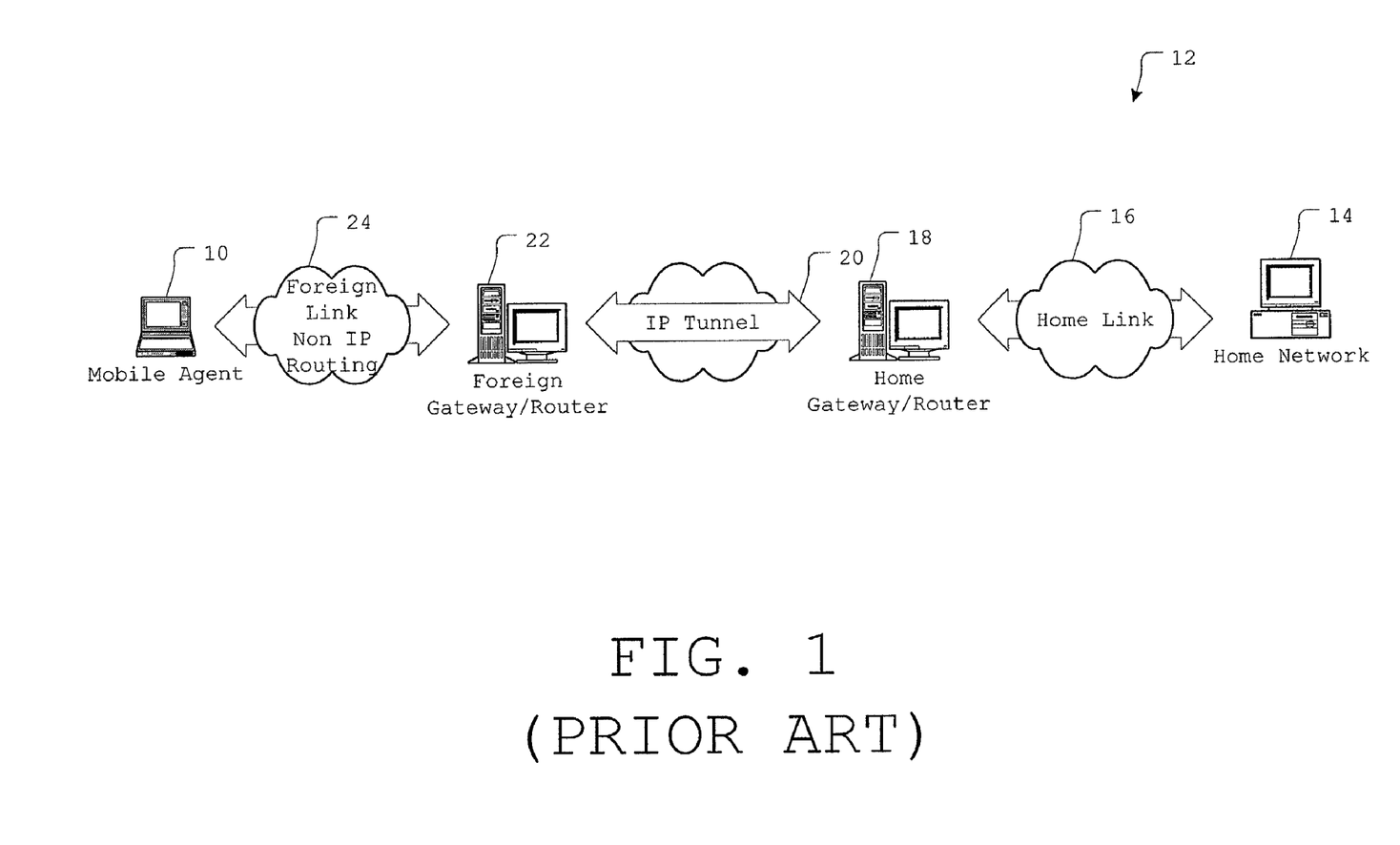
FIG. 1 (PRIOR ART) is a block diagram of a network arrangement.

Referring to FIG. 1, under the mobile IP standard propagated by the Internet Engineering Task Force (IETF), a mobile agent 10 can wirelessly and continuously be connected to a network infrastructure 12 using the same IP address regardless of the mobile agent's physical location. The mobile agent 10 is identified by a home address providing information about the mobile agent's home network 14. When the mobile agent 10 connects to the network infrastructure 12 away from its home link 16, the mobile agent 10 is identified by the home address and by at least one care-of address providing information about the mobile agent's current location.

Packets or datagrams sent across the network infrastructure 12 to the mobile agent's home address are transparently routed to the mobile agent's care-of address. The packets or datagrams destined for the mobile agent's home address are received at the home link 16 by a home gateway/router 18 that tunnels the packets or datagrams to the mobile agent's care-of address via an IP tunnel 20. The care-of address may be an address for a foreign gateway/router 22 that forwards the packets or datagrams to the mobile agent 10 over a foreign link 24 that does not use IP routing. As the mobile agent 10 changes physical location and switches to a different foreign gateway/router to maintain connectivity to the network infrastructure 12, the mobile agent 10 updates the home gateway/router 18 with its new care-of address. In this way, the mobile agent 10 can relocate, connect to various foreign gateways/routers, and maintain a constant IP address presence without interruptions or disturbances in network connectivity.

DESCRIPTION

Figure 2:
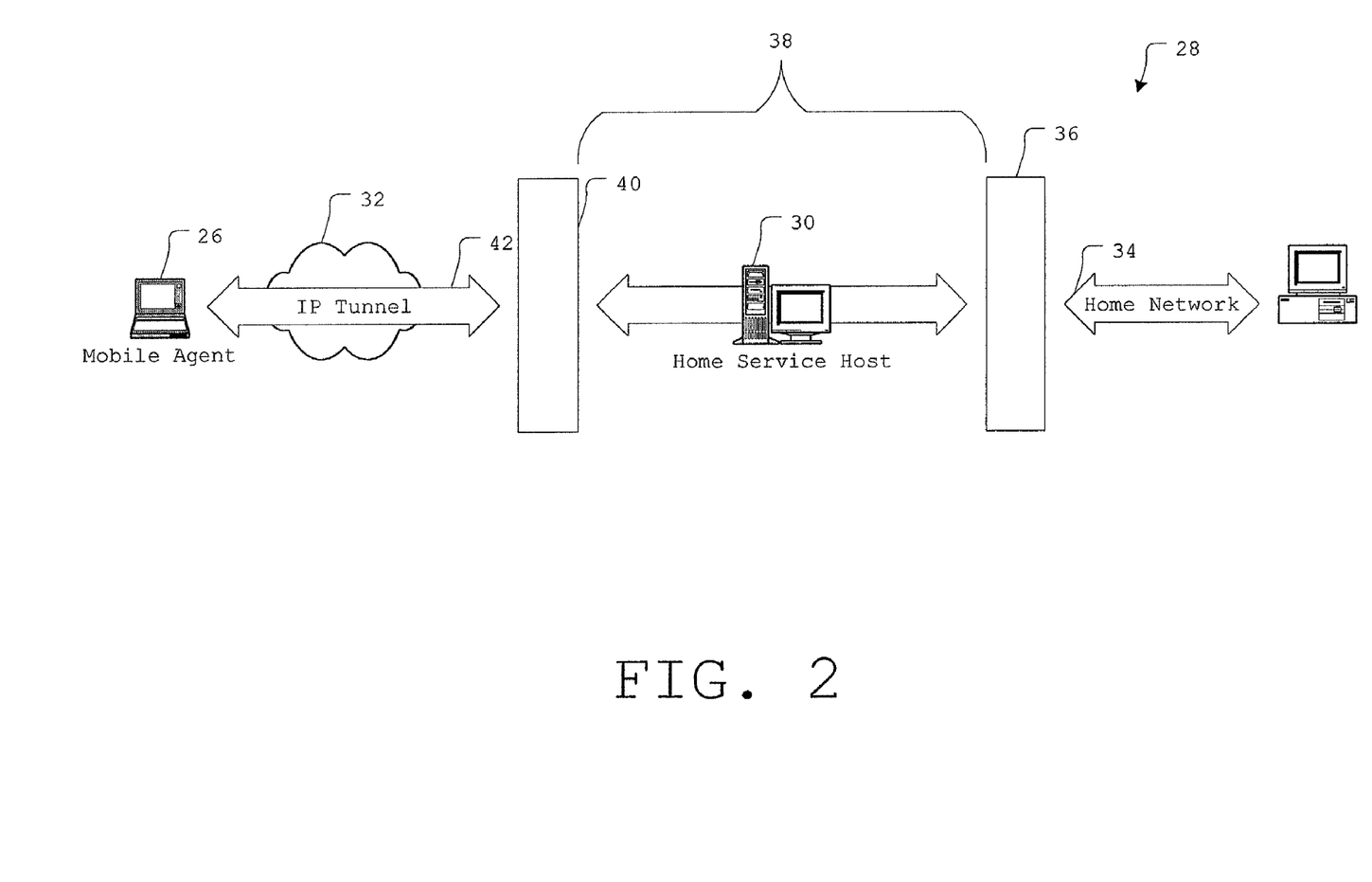
FIG. 2 is a block diagram of a network arrangement in accordance with an embodiment of the invention.

Referring to FIG. 2, a mobile agent 26 has the capability to dynamically locate itself in a network infrastructure 28 and to communicate its foreign network addressing information, e.g., a temporary care-of IP address, to a proxy server such as a home service host 30. The addressing information can use any protocol, including IP. In locating itself in the network infrastructure 28, the mobile agent 26 dynamically determines the availability of a local attach point to establish communication with a network 32 such as the Internet. Further, the mobile agent 26 dynamically determines a local addressing structure with regard to its local attach point. In this way, the mobile agent 26 can locate itself in the network infrastructure 28 on an as-needed basis. The handling of dynamically dropping and re-establishing connections to the network 32 via local attach points, e.g., foreign agents, foreign gateways, etc., as the mobile agent changes physical locations or service requirements or otherwise requires a new attach point is performed transparent to both the mobile agent's applications and an interface to allow management of the connections.

The home service host 30 is located between a network 32 such as the Internet and the mobile agent's home network 34 where the mobile agent 26 preserves a constant home IP address. A security measure 36 such as one or more firewalls or bastion hosts may sit between the home service host 30 and the home network 34, locating the home service host 30 in a demilitarized zone (DMZ) 38. Similarly, a security measure 40 may sit between the network 32 and the home network host 30.

The home service host 30 receives or intercepts packets addressed to the mobile agent's home IP address sent by sources included in or connected to the network 32. The home service host 30 encapsulates the packets and IP routes the encapsulated packets to the mobile agent's temporary IP address over an IP tunnel 42 included in the network 32. Internally, the mobile agent 26 de-encapsulates the packets and hands the resulting base packets to its network stack. The communications between the mobile agent 26 and the home service host 30 do not require any modifications to the network infrastructure 28, the network 32, or the network's routing protocols.

The mobile agent 26 and the home service host 30 both have various responsibilities in enabling the mobile agent 26 to dynamically attach to the network 32 via a foreign gateway/router (not shown) without requiring a specific network architecture or a complete re-authentication of the mobile agent 26 with the home network 34 to establish a new connection. The mobile agent 26 is a full computation unit with the capability to inquire about and adapt to a set of routing and IP naming structures. The mobile agent's responsibilities include:

a) identifying the availability of external network connectivity, e.g., determining whether and/or when to connect to an external network via a foreign gateway/router, b) negotiating with the external network connectivity for a valid local routing (temporary care-of) address, c) contacting the home service host 30 to identify that the mobile agent 26 is now connected to the external network, d) forwarding any queued or active communication with IP encapsulation and using the dynamically assigned local address for the source of the communication, e) receiving IP encapsulated responses from the home service host 30 and de-encapsulating them for the network stack, f) detecting the dropping of network service availability, and g) providing applications with the ability to determine estimated network response time.

The home service host 30 is a fixed home agent identifiable by a constant DNS (domain name system) name or IP address. Therefore, the home service host 30 can be a constant reference point for the mobile agent 26 and manage communication to and from the mobile agent 26. The home service host 30 can act as the constant reference point for any number of mobile agents. The home service host's responsibilities include:

a) remaining at the constant DNS name or IP address, b) knowing and being the gateway for the home network IP addresses of any number of mobile agents, c) buffering any packets routed to a mobile agent if the mobile agent is not in communication with the home service host 30, d) accepting requests from a mobile agent to establish a routing address to and from the mobile agent, including any required authentication, e) accepting and encapsulating any IP packets sent to a mobile agent, f) forwarding the encapsulated packets to the home network 34, g) detecting the dropping of connectivity to a mobile agent, h) performing the buffering of sent but undelivered packets to a mobile agent, i) executing a time sequence communication purging policy to drop aged packets, and j) resuming packet flow when connection with a mobile agent is re-established.

The mobile agent 26 and the home service host 30 are both initialized with information enabling them to fulfill their responsibilities and/or to communicate with each other over the network 32. The mobile agent 26 is initialized with three sets of parameters. First, the mobile agent 26 is initialized with a home network static IP address. Alternatively, the mobile agent 26 could dynamically request an IP address from the home service host 30. Applications and services are unaware of any changes in the mobile agent's local address unless they explicitly check for changes through local identification services. Second, the mobile agent 26 is initialized with the negotiation protocols for the supported communication mediums. This information may include the static assignment of medium addresses such as a phone number or a static IP address. Finally, the mobile host is initialized with the home service host's communication address. This communication address may vary depending on the connection medium and the connection location. A specific variation includes inside and outside the home network 34 where the actual home service host contacted may vary.

The home service host 30 is initialized with information about each mobile agent with which it may communicate. This information includes: 1) the home network IP address of each mobile agent, and 2) the authentication protocol and appropriate shared secrets for each mobile agent such as public keys, private keys, and validation parameters.

Figure 3:
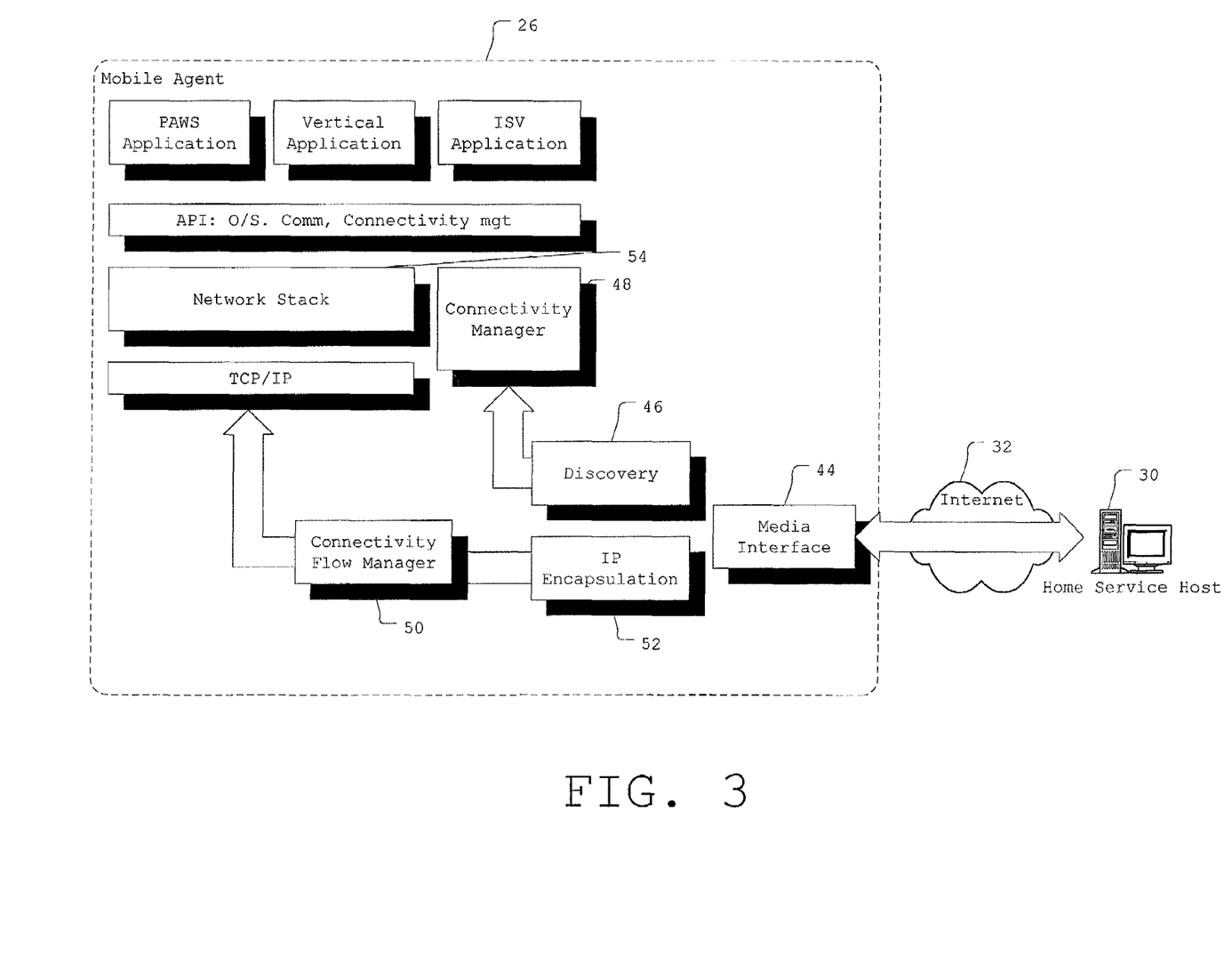
FIG. 3 is a block diagram showing a mobile agent included in the network arrangement of FIG. 2.

Referring to FIG. 3, the mobile agent 26 includes hardware and/or software components 44-54 that allow the mobile agent 26 to dynamically establish connectivity to the network 32. The components 44-54 also interact to enable the mobile agent 26 to communicate with the home service host 30 over the network 32.

Figure 4:
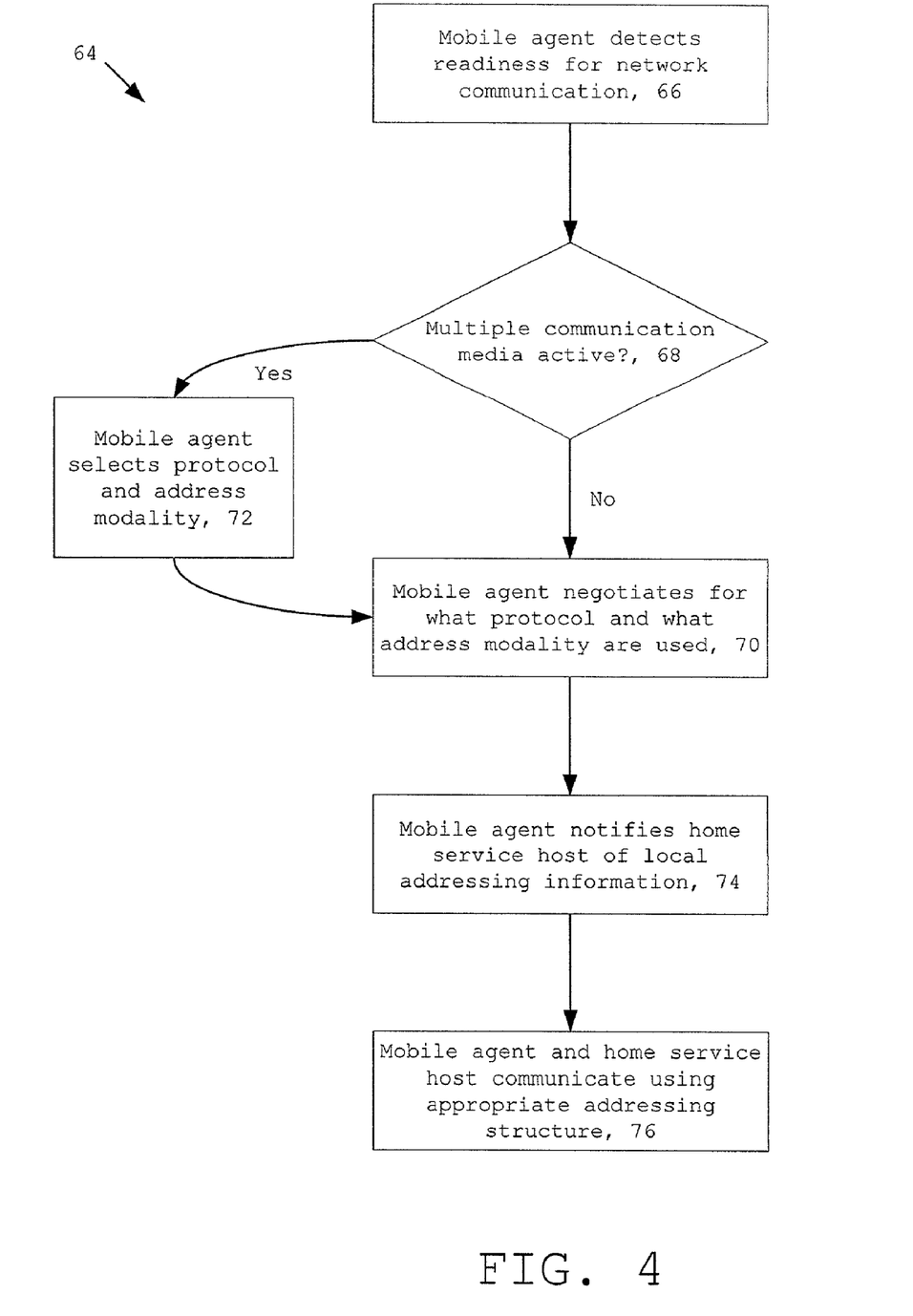
FIG. 4 is a flowchart showing a process of connecting a mobile agent to a network in accordance with an embodiment of the invention.

Referring to FIG. 4, the mobile agent 26 dynamically discovers its local addressing information and establishes connectivity with the home service host 30 with a process 64. The mobile agent 26 detects 66 a readiness for communication to one or more networks, such as the network 32, using a media interface 44. The media interface 44 includes one or more connectivity hardware and software communication media interfaces that are or could be active. Being active indicates that the mobile agent 26 is connected to or is ready to be connected to the network 26. Each media interface and associated driver can either detect that the mobile agent 26 is now connected to a network or will connect to a network under explicit direction of a mobile agent application, e.g., electronic mail (email), short messaging, and paging. The communication media that the media interface 44 can use include an Ethernet, USB (Universal Serial Bus), serial line, POTS (Plain Old Telephone Service), IrDA (Infrared Data Association), Bluetooth, CDPD (Cellular Digital Packet Data), GPRS (General Packet Radio Service), a global system for mobile communications (GSM) standards such as 1XRRT, and ATM (Asynchronous Transfer Mode).

Once one or more communication media have indicated a readiness for communication, the mobile agent 26 via a discovery agent 46 determines 68 whether multiple communication media are active. If only one communication medium is active or is to become active, the discovery agent 46 enters 70 into a negotiation for what protocol and what address modality are actually used for that communication medium. The negotiation is communication specific and is defined by the standards for the active communication medium.

If there are multiple communication media active or to become active, the discovery agent 46 selects 72 one or more of the active communication media for utilization in the communication of packets between the mobile agent 26 and the home service host 30. Each communication medium can require a separate negotiation, with the home service host 30 managing the convergence of separate channels. The technique and tools for the home service host's management of the convergence addressing service policies and user management of service cost structures using a connectivity manager 48 can include using DHCP, dialing a modem bank, static IP, 1394, USB, and/or proprietary connection mechanisms. After selecting one or more active communication media, the discovery agent 46 enters 70 a negotiation for the protocol and addressing modality used as described above.

The addressibility solution associated with a particular communication medium may have multiple formats and steps. The final step to the home service host 30 will be an Internet protocol, e.g., DHCP, dialing a modem bank, static IP, 1394, USB, and/or proprietary connection mechanisms. Early steps will be defined by the communication medium and any intermediate communication media.

Once the mobile agent 26 has negotiated a protocol and self addressing information, the discovery agent 46 uses the fixed IP address or name of the home service host 30 as the destination of a network protocol to identify the mobile agent 26 to the home network 34. A number of different protocols can be used, depending on the assumptions about the robustness and latency of the particular communication medium.

The mobile agent 26 notifies 74 the home service host 30 of the mobile agent's local addressing information so the home service host 30 can appropriately forward packets addressed to the mobile agent 26. This notification can be done over a secure connection, a non-secure connection, or a combination of both. Once communication has been established between the mobile agent 26 and the home service host 30, the two agents 26, 30 can communicate 76 using IP encapsulation of the home network packets and the appropriate addressing structure for the multistage communication between the two agents 26, 30.

Figure 5:
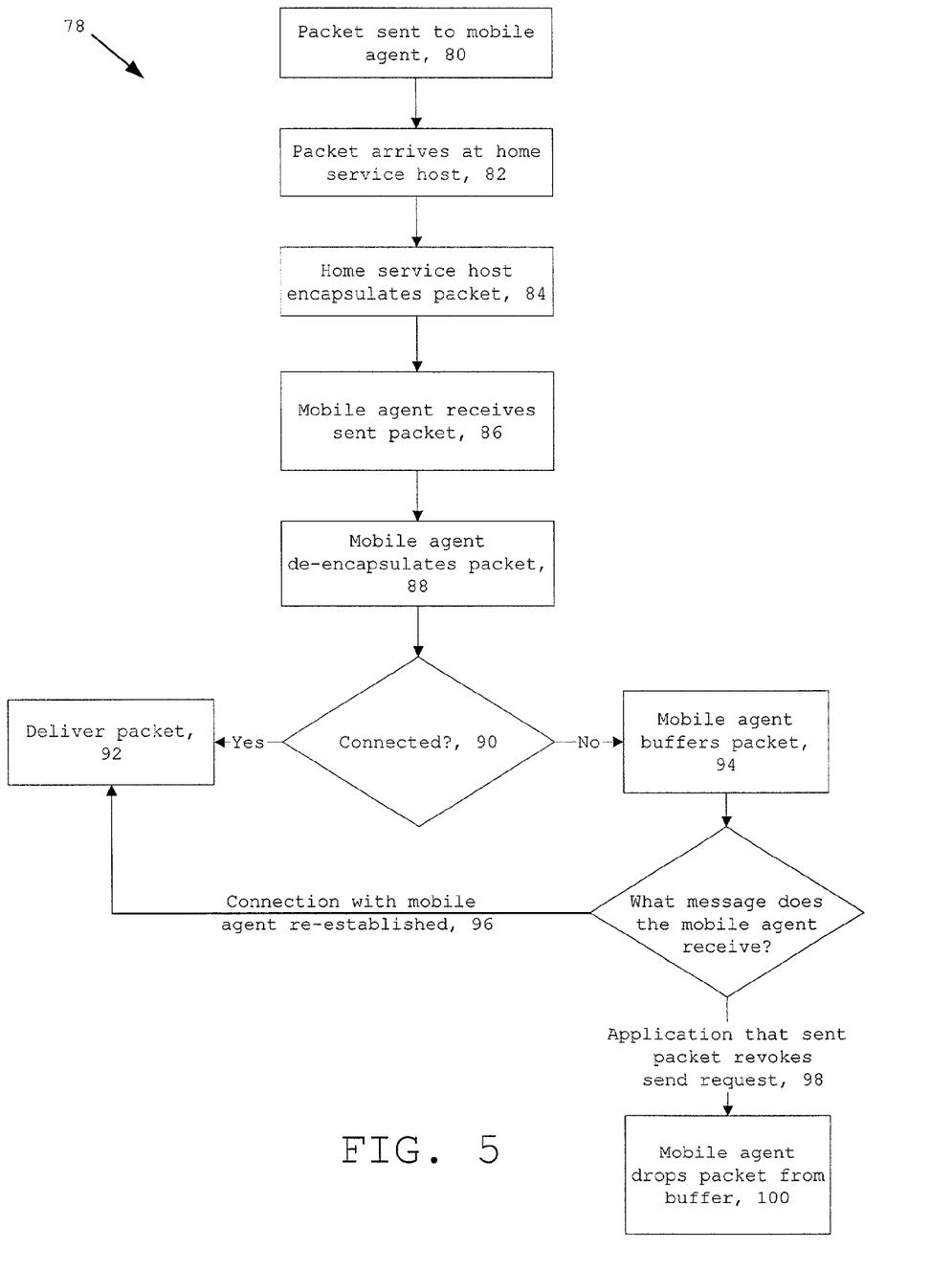
FIG. 5 is a flowchart showing a process of transmitting a packet to a mobile agent in accordance with an embodiment of the invention.

Referring to FIG. 5, packets are transmitted to the mobile agent 26 using a process 78. When a source on the network 32 sends 80 a packet to the mobile agent 26 at its home network address, the packet arrives 82 at the home service host 30. The home service host 30 encapsulates 84 the received packet for transmission to the mobile agent 26. The encapsulation (tunneling) can be accomplished using any encapsulation technique compatible with the network 32 and the mobile agent's local addressing scheme, e.g., IPsec (IP security) and encrypted packets. In conjunction with the home service host 30, a connectivity flow manager 50 included in the mobile agent 26 compresses the packet with traditional or semantic compression algorithms. Also in conjunction, the compressed packet is sent to the mobile agent 26 via the most effective active communication medium based upon, e.g., mobile agent user specified cost and speed policies.

The mobile agent 26 receives 86 the packet and de-encapsulates 88 the packet with an IP encapsulation agent 52. Before the packet is sent to the mobile agent's network stack 54, the discovery agent 46 and the connectivity manager 48 determine 90 if the mobile agent 26 is still connected. The discovery agent 46 and the connectivity manager 48 manage the loss and re-establishment of the mobile agent's connection with the home service host 30. Applications, such as email, short messaging, and paging, also have the option of managing and responding to the loss of connectivity.

If the mobile agent 26 is connected, the packet is delivered 92 to the mobile agent's network stack 54. If the mobile agent 26 is not connected, the connectivity flow manager 50 buffers 94 the packet. Thus, buffered packets are those packets sent to the mobile agent 26 but not delivered. However, buffered packets may be delivered in the future. If the connection is re-established 96, then the packet is delivered 92. Alternatively, if the application that sent the packet, e.g., an electronic mail (email), short messaging, or paging application, revokes 98 the send request associated with the packet, then the connectivity flow manager drops 100 that packet from the buffer.

The subject matter described in this specification may be implemented as an article comprising a machine-readable medium which stores machine-executable instructions. The instructions of the article are designed to cause a machine to: dynamically determine addressing information for a mobile agent at a mechanism configured to provide the mobile device with access to a network. The article can further cause a computer to dynamically discover the mechanism configured to provide the mobile device with access to the network. The article can further cause a machine to communicate the addressing information to a home network where the mobile agent maintains a static address. The article can further cause a machine to create a communication tunnel using the addressing information between the mobile agent and a home network where the mobile agent maintains a static address. In the article, the addressing information can include Internet Protocol addressing information. The article can further cause a machine to repeat the dynamic determining after the mobile agent changes physical location. The article can further cause a machine to dynamically switch the mobile device between mechanisms configured to provide the mobile device with access to the network while maintaining a continuous connection between the mobile device and the network. Dynamically determining addressing information in the article can include determining which protocol to use for communication between the mobile agent and the network. Dynamic determining in the article can be performed transparently to an application associated with the mobile agent and communicating with the network. The network in the article can include an Internet. Alternatively, the network in the article can include a local network.

Other embodiments are within the scope of the following claims.

What is claimed is:

1. A method comprising:
in a mobile agent, dynamically identifying a number of communication media available to form a connection;
in the mobile agent, when detecting that the identified number exceeds one, dynamically selecting one or more of the available communication media to form a connection;
in the mobile agent, forming a connection with the selected one or more communication media, wherein the forming the connection comprises:
in the mobile agent, negotiating an active communication status with the selected one or more communication media; and
in the mobile agent, dynamically detecting a local addressing information for the mobile agent; and
in the mobile agent, establishing a connectivity with a static home network environment comprising:
in the mobile agent, notifying the static home network environment of the dynamically detected local addressing information;
in the mobile agent, establishing an addressability tunnel to the static home network environment;
in the mobile agent, using the established addressability tunnel to receive encapsulated packets from the static home network environment; and
in the mobile agent, de-encapsulating the received encapsulated packets.

2. The method of claim 1, wherein the mobile agent comprises a mobile device, wherein the method further comprises, in the mobile agent, dynamically discovering a mechanism to provide the mobile device with access to the available communication media.

3. The method of claim 1 further comprising creating the addressability tunnel using addressing information between the mobile agent and the static home network environment.

4. The method of claim 3 in which the addressing information includes Internet Protocol addressing information.

5. The method of claim 4 further comprising repeating the dynamic selecting with the mobile agent after the mobile agent changes physical location.

6. The method of claim 5 further comprising with the mobile agent, dynamically switching the mobile agent between the available communication media while maintaining a continuous connection with the mobile agent.

7. The method of claim 1 in which forming a connection with the selected one or more of the available communication media includes, in the mobile agent, determining a protocol to use for communication between the mobile agent and the selected one or more of the available communication media.

8. The method of claim 1, further comprising hosting a plurality of channels with the mobile agent for the selected one or more available communication media.

9. The method of claim 3 in which the selected one or more of the available communication media include at least one selected from a group including Internet, an Ethernet, a Universal Serial Bus (USB), a serial line, a Plain Old Telephone Service (POTS), an Infrared Data Association (IrDA), a Bluetooth medium, a Cellular Digital Packet Data (CDPD) medium, a General Packet Radio Service (GPRS) medium, a local network, a global system for mobile communications (GSM) standard, and an asynchronous transfer mode (ATM) communication medium.

10. An article comprising a machine readable medium which stores machine executable instructions, the instructions causing a machine to:
 in a mobile agent, dynamically identify a number of communication media available to form a connection;
 in the mobile agent, when detecting that the identified number exceeds one, dynamically select one or more of the available communication media;
 in the mobile agent, form a connection with the selected one or more of the available communication media, wherein the forming the connection comprises:
  in the mobile agent, negotiate an active communication status with the selected one or more of the available communication media; and
  in the mobile agent, dynamically detecting a local addressing information for the mobile agent; and
 in the mobile agent, establish a connectivity with a static home network environment comprising:
  in the mobile agent, notifying the static home network environment of the dynamically detected local addressing information;
  in the mobile agent, establish an addressability tunnel to the static home network environment;
  in the mobile agent, using the established addressability tunnel to receive encapsulated packets from the static home network environment; and
  in the mobile agent, de-encapsulating the received encapsulated packets.

11. The article of claim 10, wherein the mobile agent comprises a mobile device, wherein the article further causes a mobile agent to dynamically discover a mechanism to provide the mobile device with access to the selected one or more of the available communication media.

12. The article of claim 10 further causing the mobile agent to create the addressability tunnel using addressing information between the mobile agent and the static home network environment.

13. The article of claim 12 in which the addressing information includes Internet Protocol addressing information.

14. The article of claim 13 further causing the mobile agent to repeat the dynamic selecting after the mobile agent changes physical location.

15. The article of claim 10 further causing the mobile agent to dynamically switch the mobile agent between the available communication media while maintaining a continuous connection with the mobile agent.

16. The article of claim 10 in which forming a connection with the selected one or more of the available communication media includes in the mobile agent, determining a protocol to use for communication between the mobile agent and the selected one or more of the available communication media.

17. The article of claim 10, further comprising hosting a plurality of channels with the mobile agent for the selected one or more of the available communication media.

18. The article of claim 10 in which the available communication media include at least one selected from a group including Internet, an Ethernet, a Universal Serial Bus (USB), a serial line, a Plain Old Telephone Service (POTS), an Infrared Data Association (IrDA), a Bluetooth medium, a Cellular Digital Packet Data (CDPD) medium, a General Packet Radio Service (GPRS) medium, a local network, a global system for mobile communications (GSM) standard, and an asynchronous transfer mode (ATM) communication medium.

19. An apparatus comprising:
 a first mechanism in a mobile agent configured to:
  identify a number of communication media available to form a connection;
  when detecting that the identified number of available communication media exceeds one, dynamically select one or more of the available communication media to form a connection;
 a second mechanism in the mobile agent to
  form a connection with the selected one or more of the available communication media comprising:
   negotiate an active communication status with the selected one or more of the available communication media; and
   dynamically detect a local addressing information for the mobile agent; and;
  establish a connectivity with a static home network environment comprising:
   notify a static home network environment of the dynamically detected local addressing information;
   establish an addressability tunnel to a static home network environment; and
   in the mobile agent, using the established addressability tunnel to receive encapsulated packets from the static home network environment; and a third mechanism in the mobile agent connected to the first or second mechanism, wherein the third mechanism is configured to de-encapsulating the received encapsulated packets.

20. The apparatus of claim 19, wherein the negotiating is based on communication standards of the selected one or more available communication media.

21. The apparatus of claim 19 wherein the home network environment is configured to host a plurality of channels to the available communication media.

22. The apparatus of claim 19 further comprising a third mechanism in the mobile agent configured to use an address associated with the static home network environment as a destination of a network protocol to identify the mobile agent with the static home network environment.

23. The apparatus of claim 19, wherein the available communication media include at least one selected from a group including Internet, an Ethernet, a Universal Serial Bus (USB), a serial line, a Plain Old Telephone Service (POTS), an Infrared Data Association (IrDA), a Bluetooth medium, a Cellular Digital Packet Data (CDPD) medium, a General Packet Radio Service (GPRS) medium, a local network, a global system for mobile communications (GSM) standard, and an asynchronous transfer mode (ATM) communication medium.

* * * * *